3,006,891
EPOXIDE RESIN PROCESS AND COMPOSITION
Otho Leroy Nikles, Phoenixville, Pa., assignor to Ciba Products Corporation, Phoenixville, Pa., a corporation of Delaware
No Drawing. Filed Jan. 27, 1959, Ser. No. 789,261
8 Claims. (Cl. 260—47)

This invention relates to epoxy resin compositions and a method for producing same. Epoxy resins are well known in the plastic art and are valuable in the manufacture of coatings, molding resins, adhesives, and the like. The present invention provides a method for producing epoxy resins which have excellent color, clarity and high adhesion properties. By means of applicant's novel process higher molecular weight 1,2-epoxy resins can readily be obtained from lower molecular weight epoxy resins, the higher molecular weight resins so produced, being readily reproducible, essentially linear in character, having relatively definite melting points solvent solubility, and being curable to solid infusible products.

It has already been proposed to prepare high molecular weight epoxy resins by reacting an initial low molecular weight or melting point epoxy resin with a dihydric phenol. According to the prior art processes the initial low molecular weight epoxide resin is first produced by reacting a dihydric phenol such as bisphenol A (4,4'-dihydroxydiphenyldimethyl methane) with epichlorhydrin or glycerol dichlorhydrin in the presence of caustic alkali, then adding to the low molecular weight epoxy resin thus formed a dihydric phenol and effecting the recation of dihydric phenol with the initial epoxy resin in the presence of an alkali metal hydroxide, like sodium hydroxide or a metal salt, like sodium acetate to form a higher melting point or higher molecular weight epoxy resin.

However, all attempts to effect this advancement of a low molecular weight epoxy resin to a high molecular weight resin in the presence of such alkaline catalysts have generally proven to be unsuccessful or erratic. This is due in part to the presence in most commercial resins of appreciable amounts of labile organic chlorine as chlorhydrin. Catalysts like sodium hydroxide or potassium hydroxide when used in catalytic quantities react with the labile chlorhydrin groups to form the corresponding sodium or potassium chlorides which are ineffective as catalysts. When larger quantities are used of either of these hydroxides, uncontrolled and erratic condensation and polymerization leading to branch formation occurs. When the alkali metal hydroxide is used in a quantity of 0.1 percent or more based on the weight of the reactants, gelation sets in immediately, and thermosetting, infusible and insoluble resins are obtained. In the absence of catalysts the reaction is slow and even if carried out at high temperatures is generally incomplete. The products are dark in color and generally contain branched chain or undesired polymeric products.

It has now surprisingly been found that these disadvantages can be avoided when as the catalyst a lithium salt, such as lithium chloride is used.

Accordingly, the invention provides a process for producing essentially linear 1,2-epoxy resins of higher molecular weight and higher melting point from low molecular weight low melting point 1,2-epoxy resins, which comprises reacting a low molecular weight 1,2-epoxy resin with a dihydric phenol in the presence of a lithium salt, preferably of lithium chloride.

The process of the invention yields higher molecular epoxy resin with a molecular weight approximately the same as a theoretical molecular weight of a linear epoxy resin calculated from the proportions of reactants used.

It has been found that this condensation can be carried out with good success also in the presence of inorganic salts, organic chlorine or chlorhydrin. The presence of inorganic salts effects the rate of reaction but has little effect on the degree of reaction.

Lower epoxy resins having molecular weights ranging from about 340 to above 1000 have been used in the reaction. It is preferred, however, to employ lower epoxy resins having molecular weights ranging from about 340 to 440, since these lower molecular weight resins are more easily obtained free from the salt and other by-products of manufacture. The lower the molecular weight the less resin has to be processed through the purification steps and this results in lower over-all costs. Depending on the ratio of dihydric phenol to the lower molecular weight epoxy resin employed, higher epoxy resins with molecular weights of from about 500 to 6000 (epoxy content of 4.0 to 0.4 epoxide equivalents/kg.) have been readily obtained.

Any low molecular weight 1,2-epoxy compound can be employed as the starting material. There may be used, for example, epoxidated diolefins, dienes or cyclic dienes, such as butadiene dioxide, 1:2:5:6-epoxide-hexane and 1:2:4:5-diepoxycyclohexane; epoxidated diolefinically unsaturated carboxylic acid esters, such as methyl-9:10:12: 13-diepoxy-stearate; the dimethyl ester of 6:7:10:11-diepoxy-hexadecane-1:16-dicarboxylic acid; epoxidated compounds containing two cyclohexenyl groups, such as diethylene glycol bis-(3:4-epoxy-cyclohexane carboxylate) and 3:4-epoxy-cyclohexylmethyl-3:4-epoxy-cyclohexane carboxylate. There may also be mentioned such as are obtainable by reacting a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially from aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol bis-(para-carboxyphenyl)-ether or the like. There may be mentioned, for example, diglycidyl adipate and diglycidyl phthalate. There are preferably used diglycidyl esters which substantially correspond to the formula

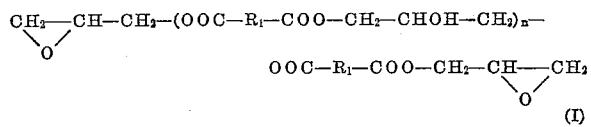

(I)

in which $R_1$ represents an aromatic hydrocarbon radical, and $n$ has the average value zero to 2

There may also be used polyethers containing two epoxide groups such as are obtainable by etherifying a dihydric alcohol or diphenol with epichlorhydrin or dichlorhydrin in the presence of an alkali. These compounds may be derived from glycols, such as ethylene glycol, diethylene glycol, triethylene glycol, propylene glycol-(1:2)-, propylene glycol-(1:3), butylene glycol-(1:4), pentane-1:5-diol, hexane-1:6-diol and especially from diphenols, such as resorcinol, pyrocatechol, hydroquinone, 1:4-dioxynaphthalene, bis-(4-hydroxyphenyl)-methane, bis-(4-hydroxyphenyl)-methylphenyl-methane, bis-(4-hydroxyphenyl)-tolyl-methane, 4:4'-dihydroxy-diphenyl, bis-(4-hydroxyphenyl)-sulfone and especially 2:2-bis-(4-hydroxyphenyl)-propane. There may be mentioned ethylene glycol diglycidyl ether and resorcinol diglycidyl ether. There are preferably used diglycidyl ethers which substantially correspond to the formula

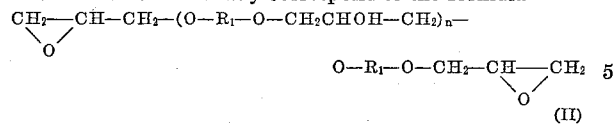

(II)

in which $R_1$ and $n$ have the meanings given for Formula I.

Especially useful as starting compounds are diglycidyl ethers which substantially correspond to the formula

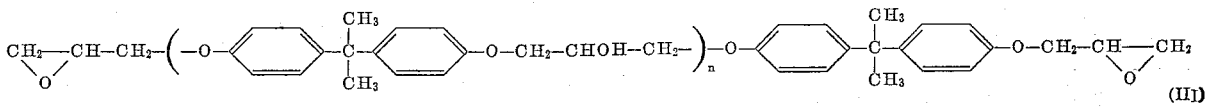

(III)

in which $n$ has the average value zero to 2, and more especially zero to 0.5.

As dihydric phenols which are used in the instant process there may be mentioned resorcinol, pyrocatechol, hydroquinone, 1:4-dihydroxy-naphthalene, bis-(4-hydroxyphenyl)-methane, bis-(4-hydroxyphenyl)-methyl-phenyl-methane, bis-(4-hydrophenyl)-tolylmethane, 4:4'dihydroxy-diphenyl, bis-(4-hydroxyphenyl)-sulfone and especially bisphenol A. Thus, bisorthocresol diglycidyl ether can readily be condensed with bisorthocresol or bisphenol A by the new process. Likewise, bisphenol A diglycidyl ether can be condensed with bisorthocresol. Because of their ready availability, the process is especially applicable to the conversion of low molecular weight 1,2-epoxy resins or polyglycidyl ethers obtained from bisphenol A and epichlorhydrin to higher molecular weight epoxy resins with bisphenol A.

It has been found, however, that in general all kinds of 1,2-epoxy resins of lower molecular weight can be converted into essentially linear epoxy resins of higher molecular weight when they are reacted with dihydric phenols in the presence of even trace amounts of lithium salts. The lithium salts can be derived from both inorganic and organic acids. Any lithium salt which yields lithium ions in the reaction mixture can be employed.

Examples of lithium salts which have been found effective are lithium carbonate, disodium lithium phosphate, lithium oxalate, lithium bisphenolate, and especially lithium chloride. The lithium salt is employed in catalytic amount, the preferred range being approximately from about 5 to 600 parts per million based on the dihydric phenol employed. By varying the amount of lithium salt the rate of reaction can be controlled.

The temperature at which the reaction is carried out may be varied since the temperature effects only the reaction rate until the hydroxyl groups of the dihydric phenol are consumed. In general, a temperature ranging from about 160° to 195° C. depending on the melting point and viscosity of the final resin being prepared is preferred. At temperatures under 150° C. the reaction is at a considerably reduced rate.

Thus, applicant's process employing lithium salts permits condensation without branch formation. When, for example, amounts of lithium chloride corresponding to 7.3-33.4 parts of lithium ion per million parts of bisphenol A are used in the condensation of a diglycidyl ether of bisphenol A (epoxy value of 5.3 epoxide equivalents/kg.) and bisphenol A at a temperature of 160-165° C., the reaction proceeds smoothly forming a linear epoxy resin of high molecular weight. The rate of condensation is directly proportional to the temperature. To insure the production of a linear polymer and at the same time to provide completion of the reaction within a short time, it is desirable to carry out the reaction at a high temperature and then control it by dropping the temperature just prior to the consumption of the dihydric phenol. A feature of the invention is that the reaction can be carried out with reactants which can be of commercial grade and need not be absolutely pure, for example, free from organic and inorganic chlorides. Thus, commercial or technical grades of the epoxy resins such as polyglycidyl ethers of bisphenol A, and of the dihydric phenols, such as bisphenol A, can be employed.

The amount of dihydric phenol employed in proportion to the epoxy resin employed dictates the degree of polymerization or condensation obtained. In general, less than one hydroxyl equivalent of the dihydric phenol per epoxide equivalent of the epoxy resin is used.

The following examples will serve to illustrate the invention, the parts being by weight:

EXAMPLE 1

2000 parts of an epoxy resin made by reacting epichlorhydrin with bisphenol A in the usual manner and having an epoxy content of 5.2–5.3 epoxide equivalents/kg. and a molecular weight of 385 are mixed with 565 parts of bisphenol A and 0.025 part of lithium chloride. The mixture is heated to a temperature of 170–175° C. and is maintained at this temperature for about two hours. The temperature is then lowered to 140–145° C. in 20 minutes and maintained at this temperature for one hour. The resin is then poured rapidly into trays and allowed to cool. The resin has the following properties:

Molecular weight _____ 800–900
Melting point (Durran) _____ 68.5° C.
Epoxide content _____ 2.17 epoxide equivalents/kg.
Viscosity at 130° C. _____ 1000 cps.

EXAMPLE 2

The same resin and same amounts of reagents were employed as in Example 1, except that in place of lithium chloride, there were used the following lithium salts in the amounts indicated:

| | Parts |
|---|---|
| Lithium bisphenolate | 0.071 |
| Lithium acetate | 0.061 |
| Lithium carbonate | 0.022 |
| Lithium oxalate | 0.031 |
| Disodium lithium phosphate | 0.087 |

The characteristics of the resins obtained with the various lithium compounds are indicated in the following table:

The molecular weight of the resin obtained ranged from 800–900.

| Lithium salt | Melting point, ° C. (Durran) | Epoxide content [1] | Viscosity at 130° C., cps. |
|---|---|---|---|
| Lithium acetate | 64 | 2.30 | 990 |
| Lithium carbonate | 65 | 2.21 | 990 |
| Lithium bisphenolate | 74 | 2.11 | 1,090 |
| Lithium oxalate | 62 | 2.40 | 900 |
| Disodium lithium phosphate | 70 | 2.19 | 1,000 |

[1] Epoxide equivalents/kg.

The condensation would appear to be catalyzed by the lithium ion regardless of the lithium salt used. The action of the lithium salts are unique since only lithium salts—not sodium or potassium salts—have been found effective.

EXAMPLE 3

The reagents and procedure were the same as in Example 1, except that lithium chloride was employed in the various amounts indicated in the following table which also gives the properties of the epoxy resin obtained:

Table

| Lithium chloride (parts per million of lithium based on bisphenol A) | M.P., ° C. | Epoxide content [1] |
|---|---|---|
| 7.3 | 68.5 | 2.17 |
| 14.6 | 71.0 | 2.11 |
| 21.9 | 74.8 | 2.12 |
| 29.2 | 74.0 | 2.11 |
| 33.4 | 74.5 | 2.12 |

[1] Epoxide equivalents/kg.

The higher molecular weight of the resin produced was from 800–900.

The higher molecular weight epoxy resins obtained by the novel process herein described are useful in the manufacture of varnishes, molding resins, adhesives, fibers, and the like. They can be cured or hardened with the conventional hardening and curing agents employed in the epoxy resin arts into infusible and insoluble products. The usual amines and polycarboxylic anhydrides can be employed for this purpose.

What is claimed is:

1. A process for producing essentially linear 1,2-epoxy resins of higher molecular weight and higher melting point from low molecular weight low melting point 1,2-epoxy resins having a molecular weight of about 340 to about 1000, which comprises reacting a low molecular weight 1,2-epoxy resin with a dihydric phenol in admixture with about 5 to about 600 parts per million based on the weight of the dihydric phenol, of a lithium salt as catalyst, which yields lithium ions in the reaction mixture.

2. A process in accordance with claim 1, wherein the low molecular weight 1,2-epoxy resin is a polyglycidyl ether of a dihydric phenol.

3. A process in accordance with claim 1, wherein the low molecular weight 1,2-epoxy resin is a polygylcidyl ether of bis-(4-hydroxyphenyl)-dimethylmethane and the dihydric phenols is bis-(4-hydroxyphenyl)-dimethylmethane.

4. A process in accordance with claim 1, wherein less than one hydroxy equivalent of the dihydric phenol per epoxide equivalent of the low molecular weight 1,2-epoxy resin is used.

5. A process in accordance with claim 1, wherein the lithium salt is lithium chloride.

6. A process in accordance with claim 1, wherein the reactants are heated to a temperature from about 160° to 195° C. until the hydroxyl groups of the dihydric phenol are substantially consumed.

7. A process in accordance with claim 1, wherein the reactants are heated to a temperature from about 160° to 195° C. until shortly before the hydroxyl groups are consumed, and subsequently the reaction is completed at a lower temperature.

8. A composition capable on heating of forming high molecular weight, substantially linear 1,2-epoxy resins, said composition consisting of a low molecular weight epoxy resin having a molecular weight of about 340 to about 1000, a dihydric phenol, and about 5 to about 600 parts per million based on the weight of the dihydric phenol, of a lithium salt as catalyst, which yields lithium ions in the reaction mixture.

References Cited in the file of this patent

UNITED STATES PATENTS

| 2,615,008 | Greenlee | Oct. 21, 1952 |
| 2,829,072 | Thomas | Apr. 1, 1958 |